United States Patent
Liu et al.

(10) Patent No.: US 10,055,825 B2
(45) Date of Patent: *Aug. 21, 2018

(54) SYSTEM AND METHOD FOR FAST DIGITAL SIGNAL DYNAMIC RANGE REDUCTION USING ADAPTIVE HISTOGRAM COMPACTION AND STABILIZATION

(71) Applicant: DRS Network & Imaging Systems, LLC, Melbourne, FL (US)

(72) Inventors: Haiying Liu, Chantilly, VA (US); James Pittman, Orlando, CA (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,546

(22) Filed: Jun. 6, 2017

(65) Prior Publication Data

US 2017/0270649 A1 Sep. 21, 2017

Related U.S. Application Data

(63) Continuation of application No. 14/211,420, filed on Mar. 14, 2014, now Pat. No. 9,704,226.

(60) Provisional application No. 61/785,690, filed on Mar. 14, 2013.

(51) Int. Cl.
*G06T 5/00* (2006.01)
*G06T 5/40* (2006.01)

(52) U.S. Cl.
CPC .............. *G06T 5/009* (2013.01); *G06T 5/40* (2013.01); *G06T 2207/10016* (2013.01); *G06T 2207/10048* (2013.01); *G06T 2207/20008* (2013.01); *G06T 2207/20208* (2013.01)

(58) Field of Classification Search
CPC combination set(s) only.
See application file for complete search history.

(56) References Cited

U.S. PATENT DOCUMENTS

| 6,061,091 A | * | 5/2000 | Van de Poel | G06T 5/009 348/241 |
| 2005/0244071 A1 | * | 11/2005 | Zaharia | G06T 9/007 382/251 |
| 2009/0274389 A1 | * | 11/2009 | Yamamoto | H04N 5/57 382/274 |
| 2014/0010480 A1 | * | 1/2014 | Cote | G06T 1/20 382/307 |

* cited by examiner

*Primary Examiner* — Tsung-Yin Tsai
(74) *Attorney, Agent, or Firm* — Kilpatrick Townsend & Stockton LLP

(57) ABSTRACT

Embodiments are directed to systems and methods to intelligently reduce the dynamic range of a signal. Using a histogram analysis of the signal, significant and insignificant portions of the original dynamic range can be identified. Compaction can then be focused on the insignificant portions of the dynamic range, resulting in significant dynamic range reduction with less signal loss. By compacting the little used portions of the original signal, the dynamic range of the rest of the signal can be largely maintained which results in little loss to signal fidelity, and thus mitigates saturation, quantization, signal mutual suppression, and other issues observed in prior art methods.

20 Claims, 7 Drawing Sheets

Raw 14 bit thermal image

FIG. 1

Output 8 bit thermal image

SYSTEM AND METHOD FOR FAST DIGITAL SIGNAL DYNAMIC RANGE REDUCTION USING ADAPTIVE HISTOGRAM COMPACTION AND STABILIZATION

CROSS-REFERENCES TO RELATED APPLICATIONS

This application is a continuation of U.S. patent application Ser. No. 14/211,420, filed Mar. 14, 2014, which claims priority to U.S. Provisional Patent Application No. 61/785,690, filed Mar. 14, 2013, the entireties of which are hereby incorporated by reference for all purposes.

BACKGROUND

Embodiments of the present invention are related to digital signal processing and, in particular, to dynamic range reduction of signals using histogram compaction.

In digital signal processing, a histogram can be used to display a visual representation of a digital signal. For example, in image processing an image histogram can show a tonal distribution of an image. Each bin in the histogram can represent a tone or range of tones and the height of each bar (which visually represents the value of the bin) can indicate how many pixels in the image have a tone corresponding to that bin. In video processing, each frame can be represented similarly using a histogram.

Dynamic range reduction can be used to serve a number of purposes. For example, the raw signal data received may be too large to be efficiently processed. Typical imaging systems may not have the resources or time to process 14~16 bit image or video data. Additionally, the imaging system may not be equipped with a monitor capable of displaying 14~16 bit data, and human eyes do not have gray scale resolution beyond 10 bits.

Prior art methods of reducing the dynamic range of a signal typically use a knee curve or smooth curves (such as logarithm/gamma curves) applied to the entire signal. This results in a number of shortcomings. In particular, the dynamic range reduction rate tends to be relatively limited. Additionally, prior art methods can result in noticeable saturation in the low and/or high ends of the signal. Quantization can also be observed where a large amount of the signal falls into the compacted portions of the signal. A loss of fidelity in the compacted portions of the signal is also observed. Further, the prior art methods may result in an unstable output signal, causing the observed output signal to fluctuate.

Embodiments of the invention address these and other problems.

SUMMARY

Embodiments of the present invention can be used to intelligently reduce the dynamic range of a signal. Using a histogram analysis of the signal, significant and insignificant portions of the original dynamic range can be identified. As used herein, insignificant portions of the original dynamic range refers to those portions of the dynamic range where there is little to no signal (e.g., bins with low or zero counts), and significant portions refers to those portions of the dynamic range which include the signal (e.g., bins with high counts). A threshold value can be determined, based on an analysis of the histogram, that defines which bins are insignificant (i.e., have a count less than the threshold value) and which bins are significant (i.e., have a count higher than the threshold value).

In accordance with an embodiment, compaction can then be focused on the insignificant portions of the dynamic range, resulting in significant dynamic range reduction with less signal loss. By compacting the little used portions of the original signal, the dynamic range of the rest of the signal can be largely maintained which results in little loss to signal fidelity, and thus mitigates saturation, quantization, signal mutual suppression, and other issues observed in prior art methods. Additionally, the processing is self-adaptive to the original signal, so that the compacted output is stable and maintains its fidelity.

In some embodiments, a method of a dynamic range compaction, can comprise receiving a digital signal having a first dynamic range, wherein the digital signal comprises a sequence of frames; compacting a frame of the digital signal from the first dynamic range to a second dynamic range using a compacting function (such as a look-up table) calculated from a previous frame in the sequence of frames; creating a histogram for the frame and based on the histogram identifying signal statistics (such as, a centroid and one or more thresholds); applying the statistics (such as the one or more thresholds) to each bin in the histogram to determine a compaction ratio for each bin; determining compacting statistics for the histogram; and building a new compacting function (such as a new lookup table) from the frame using the compacting statistics to be used to compact a subsequent frame in the sequence of frames.

In some embodiments, a system for dynamic range compaction comprises a signal capture device configured to receive a digital signal having a first dynamic range, wherein the digital signal comprises a sequence of frames and a signal processing device configured to receive the digital signal from the signal capture device. The signal processing device can be further configured to: compact a frame of the digital signal from the first dynamic range to a second dynamic range using a compacting function calculated from a previous frame in the sequence of frames; create a histogram for the frame and based on the histogram identifying signal statistics (such as a centroid and one or more thresholds); apply the signal statistics to each bin in the histogram to determine a compaction ratio for each bin; determine compacting statistics for the histogram; and build new compacting function (such as a new lookup table) for the frame using the statistics to be used to compact a subsequent frame in the sequence of frames.

Additional embodiments and features are set forth in part in the description that follows, and in part will become apparent to those skilled in the art upon examination of the specification, or may be learned by the practice of the disclosed embodiments. The features and advantages of the disclosed embodiments can be realized and attained by means of the instrumentalities, combinations, and methods described in the specification.

In the appended figures, similar components and/or features may have the same numerical reference label. Further, various components of the same type may be distinguished by following the reference by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Embodiments of the present invention are directed to dynamic range reduction of signals using a signal histogram to improve signal quality and stability.

Figure 1:
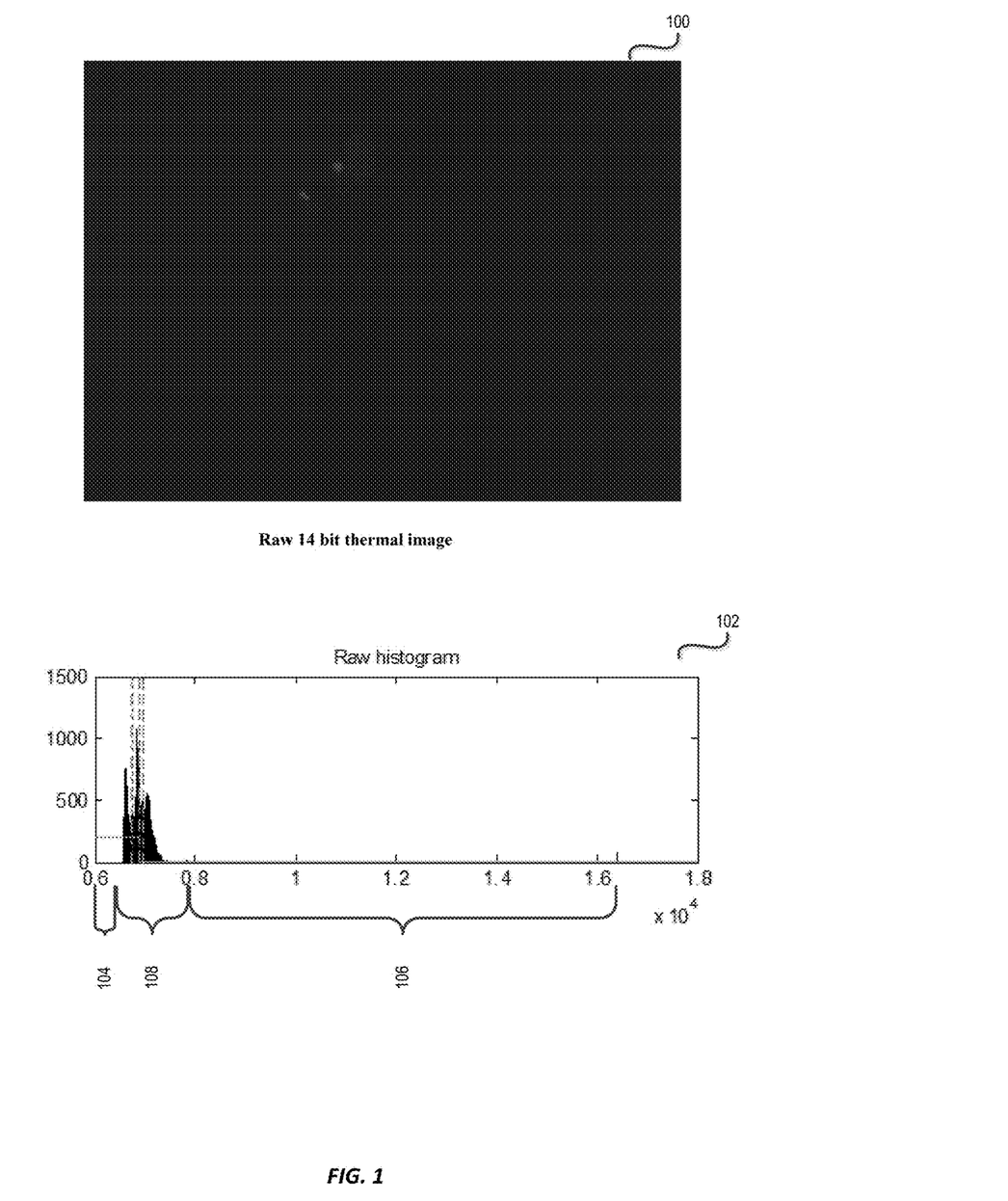
FIG. 1 shows a frame of an exemplary raw image signal and a corresponding histogram, in accordance with an embodiment of the invention.

FIG. 1 shows a frame of an exemplary raw image signal and a corresponding histogram, in accordance with an embodiment. As shown in FIG. 1, an input signal can be received which has an input dynamic range. This input dynamic range may be higher than connected output devices can support. In this example, image 100 is a frame taken from a two-dimensional thermal image signal which has a 14 bit dynamic range. This large dynamic range means that the image signal cannot be properly displayed directly on a conventional 8 bit (or even 10 bit) monitor. In order to display it properly, the dynamic range of the signal needs to be compacted (e.g., from 14 bits to 8 bits, which represents a $1/64^{th}$ reduction in dynamic range).

In accordance with an embodiment, a raw image histogram 102 corresponding to the raw image can be calculated and analyzed. The histogram can be a full histogram representing the entire frame after the entire frame has been received, or a representative histogram which is calculated as the data streams in. The representative histogram can be used to quickly identify significant and insignificant bins without requiring that every signal element (e.g., pixel) be sorted and counted. The analysis can include determining one or more threshold values to be applied to the raw histogram. A threshold value can be used to identify insignificant bins (i.e., portions of the dynamic range where there is little to no signal) as those bins which have a value lower than the threshold value. In the image processing example of FIG. 1, this may mean that the number of pixels having a tone corresponding to a particular bin is less than the threshold number of pixels. In other types of signal processing, such as audio processing, the threshold value may correspond to a different parameter or feature of the signal.

In accordance with an embodiment, a plurality of thresholds can be calculated for the histogram. When the histogram is analyzed, a centroid of the data can be identified, and a threshold for the left side of the histogram and for the right side of the histogram, relative to the centroid, can be calculated. The centroid can represent a weighted average of a received signal. For example, in the image processing examples described herein, the centroid can correspond to a weighted average of the intensity of the pixels in a given frame.

The insignificant bins in raw histogram 102 correspond roughly to portions 104 and 106. The insignificant histogram bins can be compacted first, limiting the loss of data from significant bins 108 (i.e., those bins with a value greater than the threshold value). In the example of FIG. 1, this corresponds to those bins which have more pixels than the threshold number of pixels, and thus those bins which represent most of the image. In accordance with an embodiment, the resulting compacted histogram can be shaped towards an expected distribution before being stabilized toward a histogram model adaptive to the original signal. A compacting function, in this case a look-up-table (LUT), can be created to convert the original signal histogram distribution to the compacted histogram model. The data stored in the LUT can be used to shift and scale the significant portions of the original histogram, and compact the insignificant portions of the histogram, from the input dynamic range to the compacted dynamic range. Applying the look-up-table to the original signal, results in a compacted and stabilized output. Details of the compaction are discussed in more detail below with respect to FIGS. 3-5.

Figure 2:
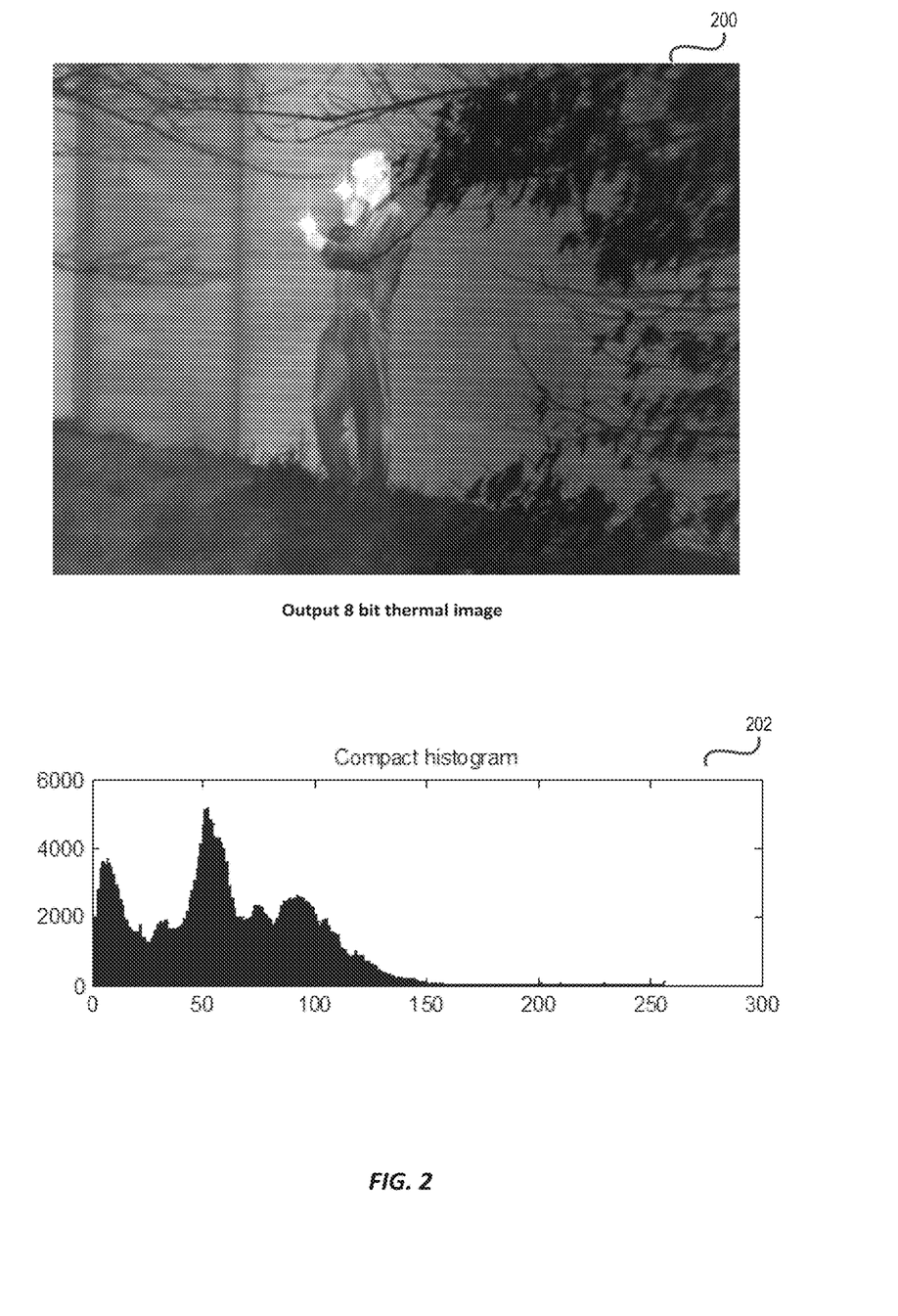
FIG. 2 shows a processed image and corresponding histogram, in accordance with an embodiment of the invention.

FIG. 2 shows a processed image and corresponding histogram, in accordance with an embodiment. Output image 200 is a processed image corresponding to raw image 100. Output image 200 has been compacted such that it has an output dynamic range (in this example, 8-bit) that is lower than the dynamic range of the input signal. As shown by compact histogram 202, the insignificant bins of histogram 102 have been intelligently compacted. The original histogram, representing a 14 bit image, has 16,384 bins each of which corresponds to a different tone. During compaction, these bins are mapped to the 256 bins shown in the compacted histogram, representing the 8 bit compacted image, using the data in the LUT. This compaction is performed intelligently, such that multiple insignificant 14 bit bins may be mapped to a single output 8 bit bin. Thus, after compaction, the significant portion of the signal occupies a larger proportion of the 8 bit dynamic range, as compared to the 14 bit dynamic range as shown in FIG. 2.

Figure 3:
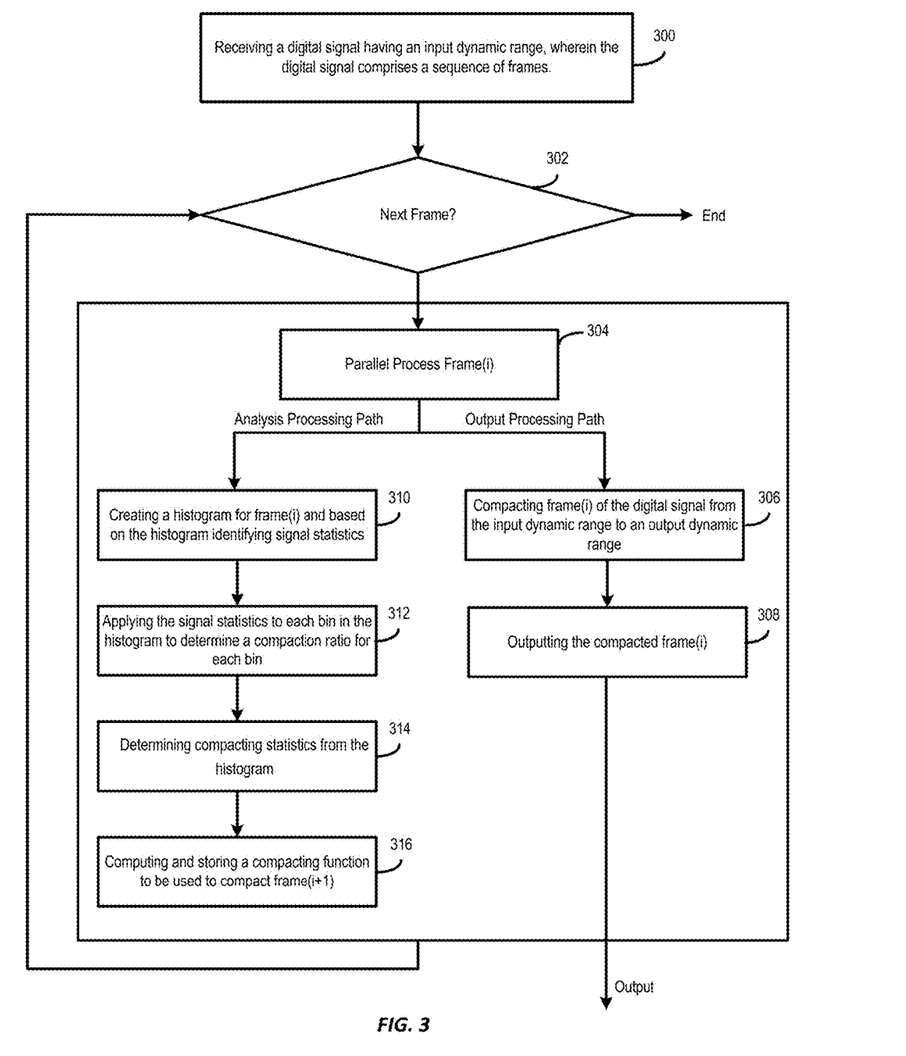
FIG. 3 shows an overview of a method of digital signal dynamic range reduction, in accordance with an embodiment of the invention.

FIG. 3 shows an overview of a method of digital signal dynamic range reduction, in accordance with an embodiment of the invention. At block 300, an input digital signal having an input dynamic range is received. This input dynamic range may be higher than is desired for a given application (e.g., the input dynamic range may be too high for connected devices to support). Embodiments of the present invention are described in which the digital signal is a digital video signal including a sequence of frames, however the methods described can be equally applied to reduce the dynamic range of other signals. At block 302, the digital signal is analyzed to determine a frame of the digital signal to process. For example, when the digital signal is initially received, an initial frame of the signal is identified for processing and any remaining frames of the signal can be processed sequentially thereafter. At block 304, the identified frame is processed on parallel processing paths: an output processing path and an analysis processing path. By processing each frame in parallel, the processed signal can be viewed with latency substantially reduced or eliminated. For applications in which latency is not a concern, all statistics and the compacting function can be computed from a frame and then applied to the same frame. When this is the case, the "previous" frame in the description can be replaced by the "current" frame.

At block 306 the dynamic range of the identified frame (e.g., frame(i), where 'i' is an integer) is compacted from the input (e.g., higher) dynamic range (e.g., 16-bits) to an output (e.g., lower) dynamic range (e.g., 8-bits) using a compacting function calculated based on a previous frame (e.g., frame (i−1)). At block 308, the compacted frame is then output to be displayed on a monitor or other system module(s). This reduces delay in real-time applications, enabling processed frames to be processed and viewed as they are received without first analyzing each frame. In some embodiments, the compaction can be customized based on the capabilities of the display. For example, in applications using an 8-bit display, each frame can be compacted from its initial dynamic range to an 8-bit output dynamic range; whereas in applications using a 10-bit display, each frame can be compacted from its initial dynamic range to a 10-bit dynamic range.

In some embodiments, while frame(i) is being compacted using data determined for frame(i−1), frame(i) can also be analyzed in parallel to determine a new compacting function (such as a look-up table) to be used to compact a subsequent frame, e.g., frame(i+1). At block 310, a histogram for frame(i) is created and signal statistics (such as a centroid of the histogram, threshold values, and number of counts relative to the centroid) are determined. Using the histogram, one or more threshold values can be determined. The threshold value(s) can be used to define significant and insignificant bins of the histogram. In some embodiments, the threshold value can be predefined. At block 312, the threshold value can be applied to the histogram to identify insignificant bins that include fewer counts than the threshold value. At block 314, based on the centroid, threshold values, and other signal statistics determined previously, compacting statistics for the histogram can be determined, such as a shift factor, a scale factor, and a centroid ratio. At block 316, the new compacting function can be computed using the compacting statistics and stored. Once processing of the frame has completed, the method can return to block 302. Each frame can be processed sequentially until the last frame in the sequence has been processed, at which point the method ends. This method is described further below, with respect to FIG. 4.

Figure 4:
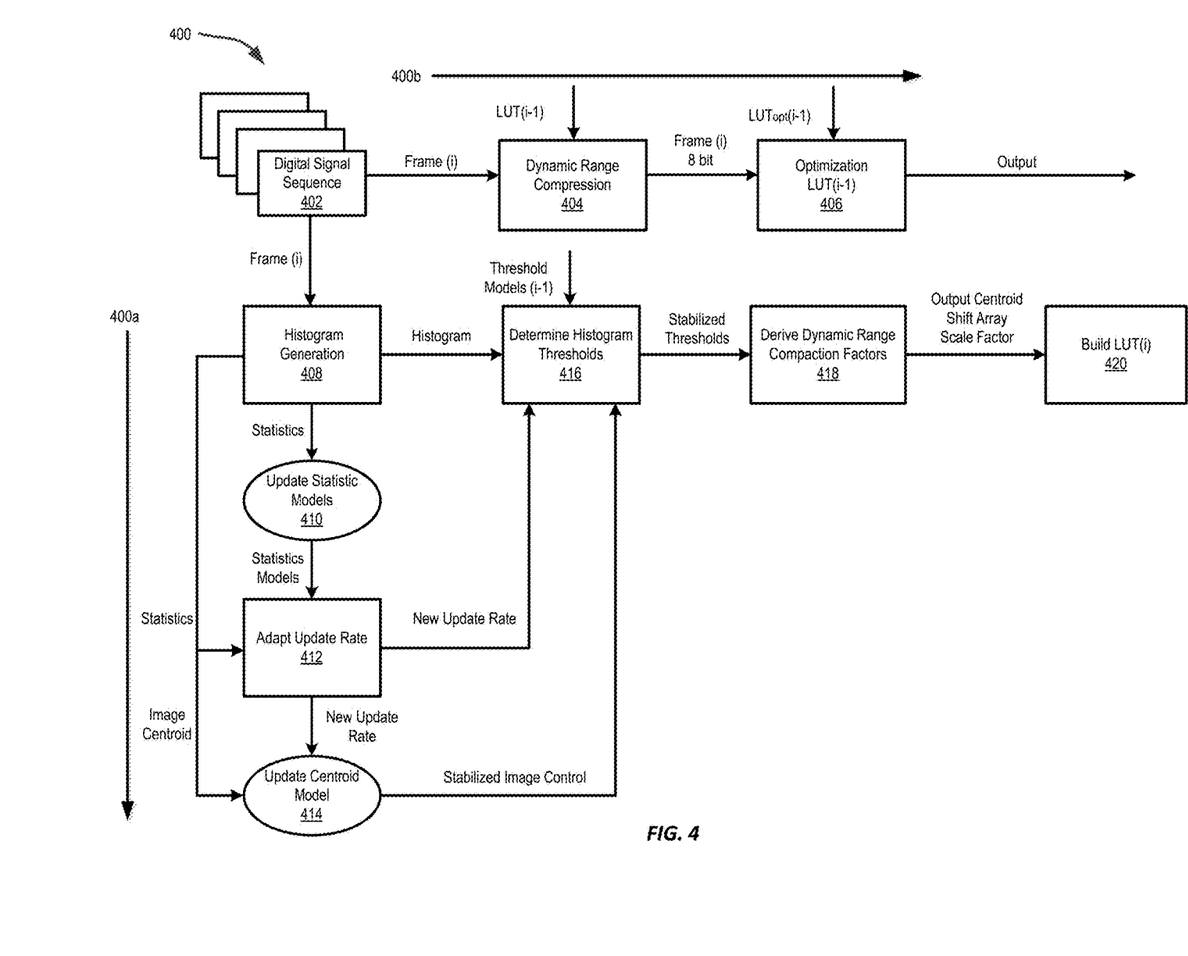
FIG. 4 shows a block diagram of a method of digital signal dynamic range reduction, in accordance with an embodiment of the invention.

FIG. 4 shows a block diagram 400 of a method of digital signal dynamic range reduction, in accordance with an embodiment. A digital signal 402 having an input dynamic range is received. The input dynamic range may be higher than desired for a given application and, as a result, the digital signal 402 may be compacted to a lower, output dynamic range (also referred to as "target dynamic range"). For the purpose of clarity, the digital signal in the example of FIG. 4 is a two-dimensional video signal comprising a sequence of image frames; however the method is equally applicable to other digital signals, such as audio signals, three-dimensional video signals, and other digital signals to which dynamic range reduction is desirable. In the method shown in FIG. 4, there is a one-frame latency on signal statistics. That is, each frame is compacted using statistics and data determined based on the previous frame. The output signal, however, has no latency. As such, the block diagram includes two paths along which each frame is processed: an analysis path 400a and an output path 400b. Each frame can be processed along both paths in parallel.

On the analysis path 400a, a histogram is generated that represents a frame of the digital signal. This histogram can be analyzed to determine signal statistics that describe the distribution of the histogram (such as the centroid of the histogram, one or more threshold values, etc.). Based on the signal statistics, compacting statistics for the histogram can be determined, such as a shift factor, a scale factor, and a centroid ratio. The signal statistics and compacting statistics can be stored and used to create a compacting function (in this example, a lookup table (LUT)) which is indexed by frame, to be used to compact a subsequent frame. In some embodiments, the compacting function can be a one dimensional table that maps bins in an input dynamic range to bins in an output dynamic range. For example, a LUT that maps from a 14-bit dynamic range to an 8-bit dynamic range can have 16,384 entries (corresponding to each possible tone in a 14-bit image) that each map to a value between 0-255 (corresponding to each possible tone in an 8-bit image). The statistics can be used to determine the mapping embodied in the LUT. Along the output path 400b, the LUT for the previous frame, LUT(i−1), is retrieved and applied to the current frame(i). The signal elements (e.g., pixels) of frame (i) are mapped from the input, higher dynamic range to the output, lower dynamic range using the LUT for the previous frame before being output to a display. The mapping reduces the dynamic range of the frame, by compacting insignificant portions of the frame while maintaining the distribution of the histogram and without introducing artifacts and/or instability to the output signal. The processing details of each path are described below in turn.

In some embodiments, at block 408 a representative histogram is generated as the frame data streams in rather than waiting for all of the frame data to be received. The representative histogram can include a predefined maximum bin cap. The bin cap can be used to quickly identify important bins without having to sort and count every signal count (e.g., corresponding to each pixel, where the signal is an image or video) that belongs to the bin. Additionally, while the frame data streams in and the signal counts are sorted and put in sequence, a sequential centroid of the data is calculated. This sequential centroid is updated as each unit of signal element (e.g., in the case of an image or video, each pixel) is received and processed. Based on the sequential centroid, the number of counts on the left and right side of the histogram, relative to the sequential centroid, is determined. The representative histogram, sequential centroid, and number of signal counts on the left/right sides of the histogram (relative to the centroid) are updated as each unit of signal element is processed.

At block 410, statistics models of the histogram statistics, including the representative histogram, sequential centroid, and number of signal counts on the left/right sides of the histogram, can be created and/or updated. The statistics models can track the changes in the histogram statistics over time (e.g., over a sequence of time indexed frames). In some embodiments, the statistics models can include a threshold model calculated based on the histogram statistics. The threshold model can include one or more histogram thresholds determined for each frame of the digital signal. For example, a histogram threshold for a given frame can be calculated using a mean number of counts per bin on the left side of the histogram, and a mean number of counts per bin on the right side of the histogram. The threshold(s) can be applied to the bins of the histogram to identify those bins which do not contribute significantly to the signal because they are associated with a relatively small number of counts.

In accordance with an embodiment, to address stability of the signal, at block 410 a stabilization model (e.g. an exponential model) can be created and/or updated based on the histogram statistics determined at block 408. The stabilization model can be applied to the representative histogram, sequential centroid, and/or threshold and can control how quickly or slowly the statistics models are updated. This improves the frame by frame stability of the data by limiting changes in intensity from frame to frame which can lead to rapid global or local signal fluctuation. An adaptive calculation process can be used to determine the rate of change of the statistics models, and determine an update rate based on the rate of change. The update rate can, for example, be used to scale the changes to the statistics calculated between frames. Changes to the statistics can be multiplied by the update rate. Thus, small changes multiplied by a small update rate are minimized; whereas large changes multiplied by a large update rate are quickly incorporated into the models. For example, the adaptive calculation process can compare the left and right sides of the histogram from one frame with the left and right sides of the histogram from the previous frame to determine how similar the two frames are. As the differences between frames increase, the update rate is increased according to the stabilization model. This makes the stabilization model respond more quickly as new frame data is received. Similarly, as the differences between frames decrease, the rate of change of the update rate can decrease. This way, the system can adapt to the changing data in a controlled fashion, providing stability.

At block 414, a histogram centroid model is updated based on the new update rate. This allows the centroid to be updated in a controlled manner. The histogram centroid model can track changes to the histogram centroid over time (e.g., across a sequence of time indexed frames). As described above, the histogram centroid can correspond to a weighted average of the intensity of signal elements (e.g., pixels) in the frame. As such, small differences in intensity between frames, which result in small differences between the frames' centroids, can result in an unstable output signal, which may be manifest as an observed local or global fluctuation in the signal. Lowering the update rate in response to small changes between frames can reduce or eliminate any observed fluctuations. Similarly, large dynamic changes in intensity between frames (e.g., if a bright or dark image enters the frame), can result in large differences between the frames' centroids. If the centroid is not updated quickly enough, a loss of clarity (such as ghosting) in the output signal may be observed. By increasing the update rate when large changes are present, the clarity of the output signal is preserved.

At block 416, histogram thresholds for the frame can be determined. As described with respect to block 408, a histogram threshold for a given frame can be calculated based on an average number of counts (e.g., pixels) per bin. In some embodiments, a mean bin value (counts/bin) of bins to the left of the histogram, and a mean bin value for bins to the right of the histogram, can be determined using a multiple pass (e.g., four pass) iterative mean. The left- and right-side mean values can be used to determine a histogram threshold. In some embodiments, the left and right sides of the histogram can each have a different threshold, based on the mean bin value on each side of the histogram. For example, the threshold value can be a percentage of the mean bin value. The threshold(s) can then be applied to the bins of the histogram to identify those bins which do not contribute significantly to the signal because they are associated with a relatively small number of counts. Once the histogram threshold values have been determined for the current frame, the thresholds can be compared with the threshold models previously calculated, and the update rate determined at block 412 can be applied to the difference between the current thresholds and the threshold models to produce stabilized thresholds. This allows for a controlled change to the threshold values from one frame to the next. The threshold models can then be updated with the stabilized thresholds for the current frame.

At block 418, the stabilized thresholds can be applied to the histogram by determining a dynamic range compaction ratio for each bin in the histogram. This compaction ratio is determined by dividing the value of the bin by the stabilized threshold value. The compaction ratio indicates whether a bin is significant or insignificant. Significant bins can have a compaction ratio greater than one, and insignificant bins can have a compaction ratio less than one. Once the significant and insignificant bins have been identified using the compaction ratio, the number of significant bins and compacted insignificant bins on the left and right sides of the centroid and the width of the data can be determined. The width of the data can correspond to the number of significant bins. This can be used to define a shift for mapping the signal data from the raw data dynamic range, to the compacted dynamic range. Thereafter, a centroid ratio can be defined based on the number of compacted bins in the shift, and based on the raw dynamic range and the target dynamic range. The centroid ratio can be used to map the bin containing the centroid in the raw, higher dynamic range, to the appropriate bin in the target, lower dynamic range. Additionally, a scale factor can be calculated which is used to shape the data so that it fits in the smaller dynamic range. The centroid ratio, shift, and scale factor are then stored for use on the subsequent frame.

At block 420, a compacting function (such as a LUT) can be built for the current frame using the data (e.g., the scale factor, centroid ratio, and shift) calculated at block 418. As described above, the compacting function can be a data structure, such as a one dimensional table, array, or other suitable data structure, that maps bins in the raw dynamic range to bins in the target dynamic range. The centroid ratio is used to map the bin of the centroid to a corresponding bin of the target dynamic range in the compacting function. The shift and scale factors can be used to map and scale the rest of the data to fit in a target range in the target dynamic range. The less significant and insignificant bins are compacted into fewer output bins in the target dynamic range, resulting in the significant bins occupying a larger proportion of the target dynamic range. In some embodiments, counts from consecutive insignificant bins in the input dynamic range can be compacted until a total counts in the compacted bin in the target dynamic range reaches the threshold value. The compacting function then maps the bins from the input dynamic range to the compacted bin in the target dynamic range (e.g., bins 16,320-16,329 in a 14-bit image can be mapped to bin 252 in an 8-bit image). This intelligent dynamic range compaction also results in a global automatic gain and level effect on the compacted data. The compacted frame can then be output to a display or other system module(s) to be viewed or further processed.

Figure 5:
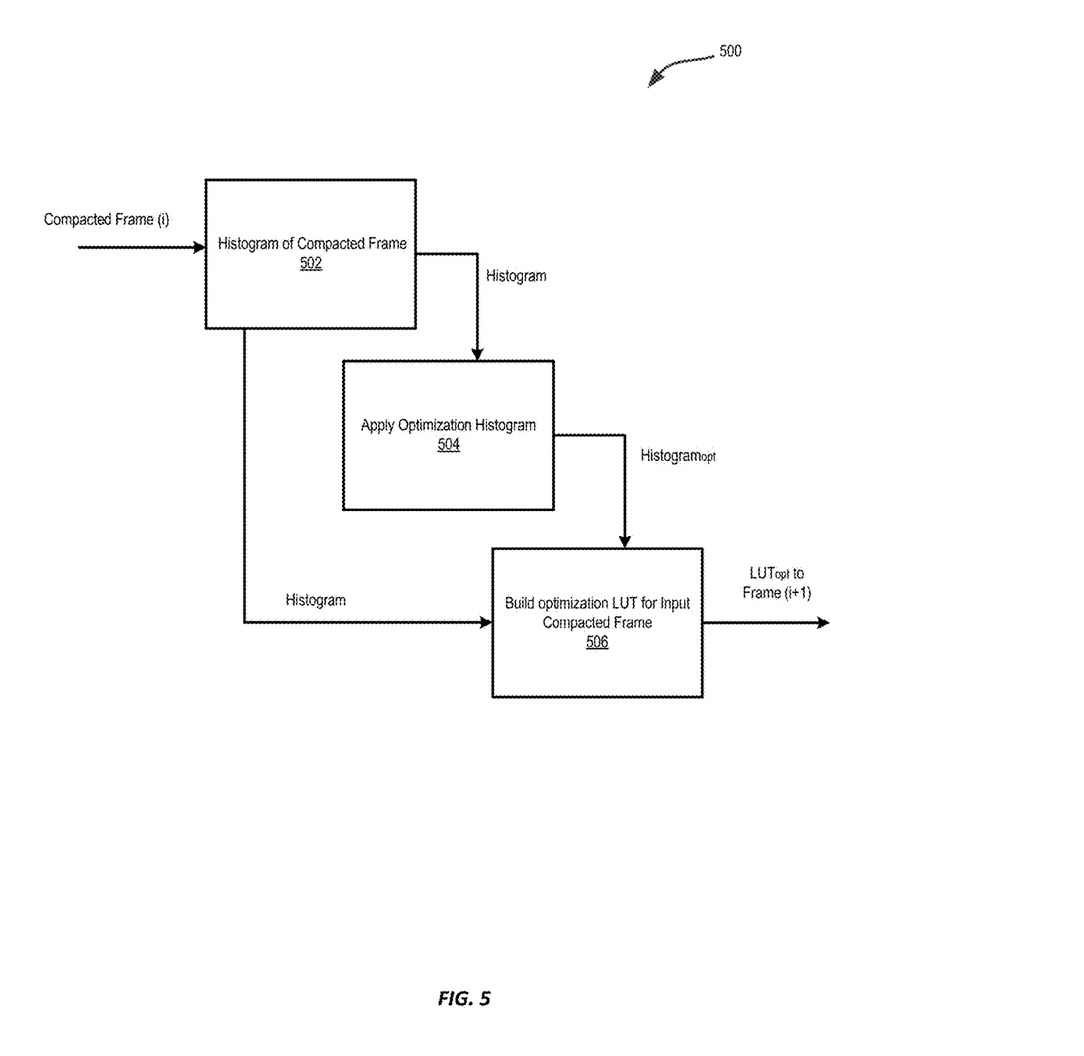
FIG. 5 shows a method of signal optimization, in accordance with an embodiment of the invention.

FIG. 5 shows a method of signal optimization, in accordance with an embodiment of the invention. As described above, at block 406 one or more optimizations can be applied to the compacted frame. FIG. 5 shows one optimization that can be applied to each compacted frame. As shown in FIG. 5, at block 502 a histogram of the compacted frame is generated. At block 504 an optimization function (such as log 2) is applied to the histogram of the compacted frame, resulting in an optimized histogram ($Histogram_{opt}$). To prevent over-optimization, at block 506, a lookup table ($LUT_{opt}$) is generated based on a combination of the optimized histogram and the histogram of the compacted frame. This combination controls the optimization of the compacted signal without producing undesirable results. The optimized lookup table ($LUT_{opt}$) maps bins from the histogram of the compacted frame (in the target dynamic range) to bins of an optimized histogram (also in the target dynamic range). In some embodiments, the user can dynamically adjust the strength of the optimized image by changing the combination of the optimized histogram and the histogram of the compacted frame.

Figure 6:
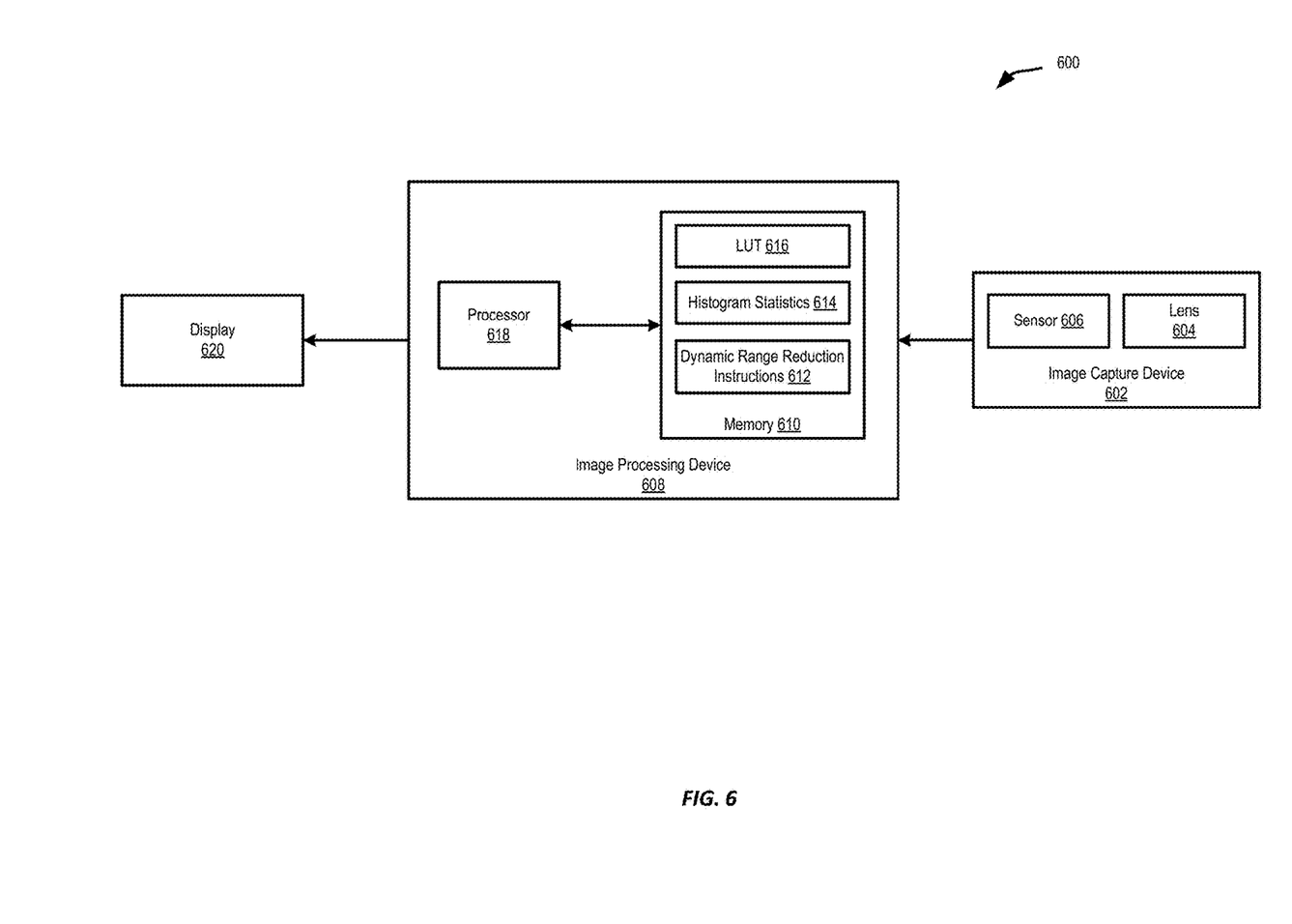
FIG. 6 shows an imaging system for digital signal dynamic range reduction, in accordance with an embodiment of the invention.

FIG. 6 shows an imaging system 600 for digital signal dynamic range reduction, in accordance with an embodiment of the invention. Imaging system 600 can represent a portable device which can be carried by a user, such as a digital camera device, or a device that can be incorporated into a larger system such as an unmanned aerial vehicle (UAV) or other system. Imaging system 600 can include an image capture device 602 which can include a lens 604 and a sensor 606, such as a charge coupled device (CCD) or complementary metal-oxide-semiconductor (CMOS) sensor, configured to capture video. The image capture device 602 can be integrated with, or otherwise connected to, an image processing device 608. Image processing device 608 can include a memory 610 that includes instructions for performing a method of dynamic range reduction, such as that described with respect to FIGS. 3-5, on images provided by image capture device 602. Memory 610 can further store histogram statistics calculated for each frame of video during dynamic range reduction, and can store one or more lookup tables 616 used during dynamic range reduction. In some embodiments, memory 610 can be integrated into image processing device 608, in other embodiments all or a portion of the contents of memory 610 can be stored in a remote data store accessible to the image processing device 608. Image processing 608 can include a processor 618, such as a general purpose microprocessor, a special purpose microprocessor, an image processor, a digital signal processor (DSP), and/or field programmable gate arrays (FPGAs), or other suitable components. Processed images can be passed from image processing device 608 to display 620 to be displayed to a user. In some embodiments, the display 620 can be integrated with the image processing device 608, and/or the image capture device 602. In some embodiments, display 620 can be connected to image processing device 608 remotely, such as through a network connection or a wireless connection.

Figure 7:
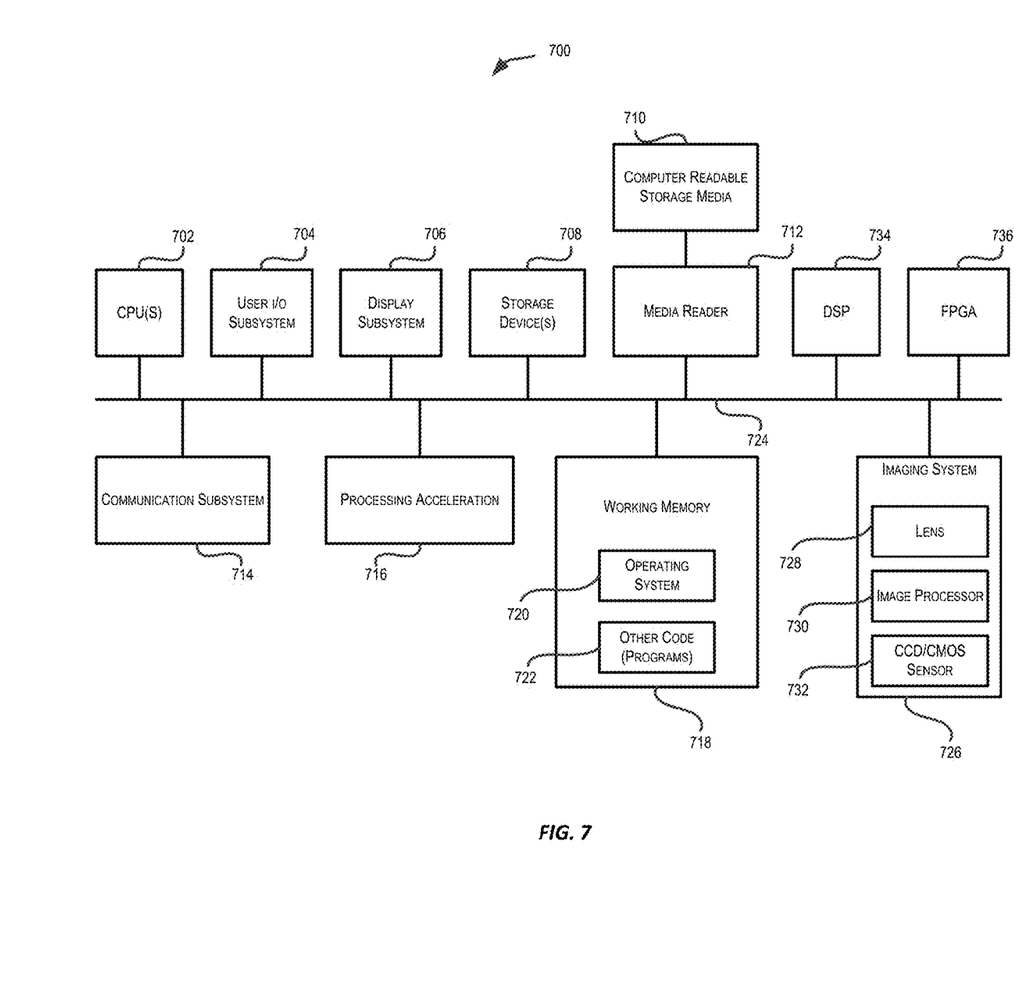
FIG. 7 shows a system for digital signal dynamic range reduction, in accordance with an embodiment of the invention.

FIG. 7 shows a system for digital signal dynamic range reduction, in accordance with an embodiment of the invention. FIG. 7 is a simplified block diagram of a computing system 700 that may be used in accordance with embodiments of the present invention. In accordance with an embodiment, computing system 700 can be incorporated into a device, such as imaging system 600, described above.

Computer system 700 is shown comprising hardware elements that may be electrically coupled via a bus 724. The hardware elements may include one or more central processing units (CPUs) 702, one or more input devices 704 (e.g., a mouse, a keyboard, touchscreen, etc.), and one or more output devices 706 (e.g., a display device, a printer, etc.). The computer system may also include a digital imaging system 726, such as thermal imager. The digital imaging system can include a lens 728, an image processor 730 and a digital image sensor such as a charge coupled device (CCD) or a complementary metal-oxide-semiconductor (CMOS) sensor. The CPUs may include single or multicore CPUs. Additionally, or alternatively, the computer system 700 may be implemented using one or more digital signal processors (DSPs) 734 and/or field programmable gate arrays (FPGAs) 736. Computer system 700 may also include one or more storage devices 708. By way of example, the storage device(s) 708 may include devices such as disk drives, optical storage devices, and solid-state storage devices such as a random access memory (RAM), a read-only memory (ROM), and/or Electrically Erasable Programmable Read-Only Memory (EEPROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, Field Programmable Gate Array (FPGA) and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 may permit data to be exchanged with a wireless or wired network and/or any other computer connected to that network. In particular, the communications system 714 is operable to, e.g., receive instructions and transmit image and/or video data captured using camera system 726.

Computer system 700 may also comprise software elements, shown as being currently located within working memory 718, including an operating system 720 and/or other code 722, such as an application program (which may be a client application, Web browser, etc.). In an exemplary embodiment, working memory 718 can include the lookup table and the image processing methods described above with respect to FIGS. 1-5. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, Compact Disc Read-only memory (CD-ROM), digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

As used herein and in the appended claims, the singular forms "a", "an", and "the" include plural references unless the context clearly dictates otherwise. Thus, for example, reference to "a processor" includes a plurality of such devices, and reference to "the subsystem" includes references to one or more subsystems and equivalents thereof known to those skilled in the art, and so forth.

What is claimed is:

1. A method of a dynamic range compaction, comprising:
   receiving a digital signal having a first dynamic range;
   compacting a frame of the digital signal from the first dynamic range to a second dynamic range using a compacting function;
   creating a histogram for the frame and based on the histogram identifying a centroid and one or more thresholds;
   applying the one or more thresholds to each bin in the histogram to determine a compaction ratio for each bin by dividing a value of each bin by one of the thresholds;
   identifying insignificant bins using a compaction ratio for each bin; and
   compacting the insignificant bins by mapping a plurality of insignificant bins from a histogram for the frame to an output bin in a histogram representing the second dynamic range using the compacting function.

2. The method of claim 1, wherein compacting a frame of the digital signal from the first dynamic range to a second dynamic range using a compacting function comprises:
   retrieving a lookup table; and
   mapping counts from each bin in the histogram to a plurality of bins in a histogram representing the second dynamic range.

3. The method of claim 1, further comprising:
   building a new compacting function for compacting a subsequent frame using compacting statistics.

4. The method of claim 3, wherein the compacting statistics include a shift factor, scale factor, and centroid ratio for the histogram.

5. The method of claim 3, wherein build a new compacting function comprises:
   determining a bin in the second dynamic range corresponding to the centroid; and
   mapping significant bins from the histogram to the second dynamic range using a shift factor.

6. The method of claim 3, further comprising:
   compacting the subsequent frame using the new compacting function.

7. The method of claim 1, further comprising:
   outputting the compacted frame to a display, wherein the display is configured to display signals having the second dynamic range.

8. A system for dynamic range compaction, comprising:
   a signal capture device configured to output a digital signal having a first dynamic range;
   a signal processing device configured to receive the digital signal from the signal capture device, and wherein the signal processing device is further configured to:
   compact a frame of the digital signal from the first dynamic range to a second dynamic range using a compacting function;
   create a histogram for the frame and based on the histogram identifying a centroid and one or more thresholds by dividing a value of each bin by one of the first thresholds;
   apply the one or more thresholds to each bin in the histogram to determine a compaction ratio for each bin;
   identify insignificant bins using a compaction ratio for each bin; and
   compact the insignificant bins by mapping a plurality of insignificant bins from a histogram for the frame to an output bin in a histogram representing the second dynamic range using the compacting function.

9. The system of claim 8, wherein to compact a frame of the digital signal from the first dynamic range to a second dynamic range using a compacting function, the signal processing device is further configured to:
   retrieve a lookup table; and
   map counts from each bin in the histogram to a plurality of bins in a histogram representing the second dynamic range.

10. The system of claim 8, wherein the signal processing device is further configured to:
    build a new compacting function for compacting a subsequent frame using compacting statistics.

11. The system of claim 10, wherein the compacting statistics include a shift factor, scale factor, and centroid ratio for the histogram.

12. The system of claim 10, wherein to build a new compacting function, the signal processing device is further configured to:
    determine a bin in the second dynamic range corresponding to the centroid; and
    map significant bins from the histogram to the second dynamic range using a shift factor.

13. The system of claim 10, wherein the signal processing device is further configured to:
    compact the subsequent frame using the new compacting function.

14. The system of claim 8, further comprising:
    a display configured to receive the compacted frame from the signal processing device, wherein the display is configured to display signals having the second dynamic range.

15. A non-transitory computer readable storage medium including instructions stored thereon which, when executed by a processor, cause the processor to perform operations including:
    receiving a digital signal having a first dynamic range;
    compacting a frame of the digital signal from the first dynamic range to a second dynamic range using a compacting function;
    creating a histogram for the frame and based on the histogram identifying a centroid and one or more thresholds;
    applying the one or more thresholds to each bin in the histogram to determine a compaction ratio for each bin by dividing a value of each bin by one of the thresholds;
    identifying insignificant bins using a compaction ratio for each bin; and
    compacting the insignificant bins by mapping a plurality of insignificant bins from a histogram for the frame to an output bin in a histogram representing the second dynamic range using the compacting function.

16. The non-transitory computer readable storage medium of claim 15, wherein compacting a frame of the digital signal from the first dynamic range to a second dynamic range using a compacting function comprises:
- retrieving a lookup table; and
- mapping counts from each bin in the histogram to a plurality of bins in a histogram representing the second dynamic range.

17. The non-transitory computer readable storage medium of claim 15, wherein the operations further comprises:
- building a new compacting function for compacting a subsequent frame using compacting statistics.

18. The non-transitory computer readable storage medium of claim 15, wherein the compacting statistics include a shift factor, scale factor, and centroid ratio for the histogram.

19. The non-transitory computer readable storage medium of claim 15, wherein building a new compacting function comprises:
- determining a bin in the second dynamic range corresponding to the centroid; and
- mapping significant bins from the histogram to the second dynamic range using a shift factor.

20. The non-transitory computer readable storage medium of claim 15, wherein the operations further comprises:
- compacting the subsequent frame of the digital signal using the new compacting function.

* * * * *